(12) United States Patent
Hagihara et al.

(10) Patent No.: US 8,164,812 B2
(45) Date of Patent: Apr. 24, 2012

(54) OPTICAL SCANNING MIRROR, SEMICONDUCTOR STRUCTURE AND MANUFACTURING METHOD THEREOF

(75) Inventors: Yousuke Hagihara, Katano (JP); Kiyohiko Kawano, Kadoma (JP); Hiroshi Noge, Tokyo (JP)

(73) Assignee: Panasonic Corporation, Osaka (JP)

( * ) Notice: Subject to any disclaimer, the term of this patent is extended or adjusted under 35 U.S.C. 154(b) by 367 days.

(21) Appl. No.: 12/524,375

(22) PCT Filed: Jan. 23, 2008

(86) PCT No.: PCT/JP2008/050890
§ 371 (c)(1), (2), (4) Date: Aug. 17, 2009

(87) PCT Pub. No.: WO2008/090921
PCT Pub. Date: Jul. 31, 2008

(65) Prior Publication Data
US 2010/0067084 A1    Mar. 18, 2010

(30) Foreign Application Priority Data

Jan. 26, 2007  (JP) ................... 2007-015970
Jan. 26, 2007  (JP) ................... 2007-015980

(51) Int. Cl.
G02B 26/08    (2006.01)
(52) U.S. Cl. .................................. 359/224.1
(58) Field of Classification Search .... 359/212.1–214.1, 359/223.1–226.1, 290, 291, 298
See application file for complete search history.

(56) References Cited

U.S. PATENT DOCUMENTS

| | | | |
|---|---|---|---|
| 6,995,495 B2 * | 2/2006 | Ko et al. | 359/224.1 |
| 2003/0227538 A1 | 12/2003 | Fujii et al. | |
| 2003/0227700 A1 | 12/2003 | Mizuno et al. | |
| 2004/0081391 A1 | 4/2004 | Ko et al. | |
| 2006/0132883 A1 | 6/2006 | Saitoh | |
| 2006/0268383 A1 | 11/2006 | Cho et al. | |

(Continued)

FOREIGN PATENT DOCUMENTS

CN    1467521    1/2004

(Continued)

OTHER PUBLICATIONS

Schenk et al., "An electrostatically excited 2D-micro-scanning-mirror with an in-plane configuration of the driving electrodes", Jan. 23, 2000, pp. 473-478, XP010377173.

(Continued)

*Primary Examiner* — Euncha Cherry
(74) *Attorney, Agent, or Firm* — Greenblum & Bernstein, P.L.C.

(57) ABSTRACT

A semiconductor structure provided with an insulation structure in a moving unit is manufactured easily. An optical scanning mirror (semiconductor structure) is formed by processing an SOI substrate consists of a first silicon layer, an oxide film and a second silicon layer. A moving unit, which is supported on a fixed frame through first hinges, is formed on the first silicon layer. The moving unit is divided into a plurality of regions by forming trenches (insulation structure). A supporting member formed of the oxide film and the second silicon layer is formed just below the trenches. The plurality of regions of the moving frame divided by the trenches are joined to the supporting member, so that the moving unit is swingable with the supporting member. Thereby, the supporting member is formed by simple etching processes, and thus, mechanical strength of the moving unit is ensured.

15 Claims, 10 Drawing Sheets

FOREIGN PATENT DOCUMENTS

| | | |
|---|---|---|
| JP | 2006-115683 | 4/2006 |
| JP | 2006-178408 | 7/2006 |
| KR | 10-0486716 | 5/2005 |
| WO | 2007/34777 | 3/2007 |

OTHER PUBLICATIONS

Schenk et al., "Large Deflection Micromechanical Scanning Mirrors for Linear Scans and Pattern Generation", IEEE Journal of Selected Topics in Quantum Electronics, vol. 6, No. 5, Sep. 1, 2000, XP011061817.

English language Abstract of JP 2006-115683, Apr. 27, 2006.

English language Abstract of JP 2006-178408, Jul. 6, 2006.

"Large Deflection Micromechanical Scanning Mirrors for Linear Scans and Pattern Generation", Harald Schenk, Peter Dürr, Thomas Haase, Detlef Kunze, Udo Sobe, Hubert Lakner and Heinz Kück, IEEE Journal of Selected Topics in Quantum Electronics, vol. 6, No. 5, Sep./Oct. 2000 pp. 715-722.

\* cited by examiner

OPTICAL SCANNING MIRROR, SEMICONDUCTOR STRUCTURE AND MANUFACTURING METHOD THEREOF

TECHNICAL FIELD

The present invention relates to an optical scanning mirror which swings a moving unit pivoted by hinges and having a mirror to which a light beam incomes from outside so as to scan a reflected light beam reflected by the mirror, and relates to a semiconductor structure used for the optical scanning mirror and so on, and a manufacturing method thereof.

BACKGROUND ART

Conventionally, an optical scanning mirror system is used in optical equipment such as a bar code reader or a projector so as to scan a light beam incoming on a mirror by swinging a mirror unit to which the mirror is provided. A compact type one having a semiconductor structure and formed with using micro-machining is known as an optical scanning mirror, for example. Such a semiconductor structure has a moving unit to which a mirror is formed and a fixed frame for supporting the moving unit, when it is used as the optical scanning mirror. The moving unit and the fixed frame are coupled with each other by hinges. A pair of comb electrodes interdigitated each other is formed between the moving unit and the fixed frame, for example. The comb electrodes are formed so that each electrode is interdigitated at an interval from 2 μm to 5 μm, and generate electrostatic force when a voltage is applied between the electrodes. The moving unit rotates relative to the fixed frame while twisting the hinges by driving force generated by the comb electrodes, so that it swings around the hinges as a rotation shaft.

By the way, as shown in a document (IEEE Journal of selected topics in Quantum Electronics, Vol. 6, No. 5, September/October 2000 p 715), there is an optical scanning mirror having a semiconductor structure that the moving unit has a mirror unit to which a mirror is mounted and a movable frame which supports the mirror unit through hinges, and a pair of comb electrodes is further formed between the movable frame and the mirror unit. FIG. 25 and FIG. 26 show an example of such a biaxial optical scanning mirror. An optical scanning mirror 81 is configured by an SOI (Silicon on Insulator) substrate 800 which is formed by joining a first silicon layer 800a and a second silicon layer 800b disposed below thereof through an insulation film 820. A mirror unit 82 and a movable frame 83 are formed on the first silicon layer 800a, and a fixed frame 84 is configured by the first silicon layer 800a, the insulation film 820 and the second silicon layer 800b. The movable frame 83 is pivoted on the fixed frame 84 through first hinges 85. The mirror unit 82 is pivoted on the movable frame 83 through second hinges 86 which are formed in a direction perpendicular to the first hinges 85. Comb electrodes 87, 88 are respectively provided between the movable frame 83 and the fixed frame 84 and between the mirror unit 82 and the movable frame 83. A mirror 82a is formed on an upper face of the mirror unit 82. Terminal regions 810a, 810b, 810c, to which voltages to drive the comb electrodes 87, 88, are formed on an upper face of the fixed frame 84. The upper face of the first silicon layer 800a except the terminal areas 810a, 810b, and 810c is covered by the insulation film 820. When voltages are applied to the terminal areas 810a, 810b, 810c, the comb electrodes 87, 88 generate driving forces, and the driving forces act on the mirror unit 82 and the movable frame 83 so that the mirror unit 82 and the movable frame 83 respectively swing while twisting the second hinges 86 and the first hinges 85.

In the semiconductor structure of the biaxial optical scanning mirror 81, it is necessary to provide to two regions which are electrically insulated each other in the movable frame 83 so as to enable to apply the voltages between the electrodes in the mirror unit 82 side and the electrodes in the movable frame 83 side of the comb electrodes 88 provided between the mirror unit 82 and the movable frame 83. In FIG. 25, the regions of the first silicon layer 800a which are electrically insulated are respectively patterned with different designs. In the conventional semiconductor structure of the optical scanning mirror 81, the movable frame 83 is insulated in two regions as illustrated in the figure, one of which is the region having the same potential as that of the electrodes in the movable frame 83 side, and the other is the region having the same potential as that of the electrodes in the mirror unit 82 side by conducting the mirror unit 82 through the second hinges 86, by providing isolation trench 89 on the moving mirror 83. Such isolation trench 89 are provided by forming insulation films 820c on side walls of each trench formed on the first silicon layer 800a and by filling polysilicon 89a into the trench, so as to maintain mechanical strength of an integration of the movable frame 83 by coupling the two regions in electrically insulated state. Thereby, it enables to swing the movable frame 83 in a unitized manner and to maintain the electric insulation of the two regions of the movable frame 83.

An example of manufacturing processes of the isolation trench 89 is described with reference to FIG. 27A to FIG. 27C. First, as shown in FIG. 27A, resists 832 are patterned on the upper face of the insulation film 820 on the first silicon layer 800a of the SOI substrate 800, and the first silicon layer 800a is etched so as to form the trenches 801a on the first silicon layer 800a. Subsequently, as shown in FIG. 27B, after removing the resists 832, the insulation films 820c are formed by oxidizing the side walls of the trenches 801a with using an electric furnace, and polysilicon is deposited to fill the trenches 801a by the polysilicon 89a. Subsequently, as shown in FIG. 27C, the polysilicon deposited on the surface of the first silicon layer 800a is removed by polishing, the isolation trench 89 are formed in the first silicon layer 800a. After that, by removing the second silicon layer 800b and the insulation film 820 just below the movable frame 83 and the mirror unit 82, the movable frame 83 and the mirror unit 82 are formed movably.

However, the manufacturing processes of the semiconductor structure become complicated when the isolation trench 89, which are formed by filling the polysilicon 89a into the trench 801a, is provided to form the movable frame 83. In addition, since it is difficult to maintain favorite electric insulation and to maintain mechanical strength due to providing the isolation trench 89, simultaneously, there is a problem that yield ratio of the products may be deteriorated. In other words, in manufacturing of the semiconductor structure of the optical scanning mirror 81, complicated processes such as a trench formation process, a side wall oxidation process, a polysilicon filling process, a polysilicon polishing process must be performed, as mentioned above. Furthermore, in the polysilicon filling process, it is difficult to fill the polysilicon 89a thickly into the trenches 801a, so that air gaps may occur in the filled polysilicon 89a, and thus, the mechanical strength of the movable frame 83 may be weaken. Still furthermore, since the two regions of the movable frame 83 are electrically insulated each other by the insulation films 820c, if the insulation films 820c are not formed preferably in the manufacturing processes, the electric insulation between the two regions may be deteriorated, and thus, malfunction may occur in the optical scanning mirror 81.

Furthermore, in case of using the above mentioned biaxial optical scanning mirror for raster scanning purpose, it is required to increased a number of scanning lines by making resonance frequency of the mirror unit 82 higher than resonance frequency of the movable frame so as to scan a precise image widely. However, since the mirror unit 82 and the movable frame 83 have substantially the same thickness in the conventional structure, it is necessary to upsize the movable frame in order to increase a ratio of the resonance frequencies of the mirror unit 82 and the movable frame 83, and thus, dimensions of the device of the optical scanning mirror 81 will be upsized and manufacturing cost thereof increases.

Still furthermore, the first hinges 85 of the movable frame 83 may be formed narrower, while the mass of the movable frame 83 is increased to make the resonance frequency thereof smaller than that of the mirror unit 82. Since the movable frame 83 is formed on the first silicon layer 800a which is made to thin a silicon substrate having a thickness of several hundreds μm to several tens μm, if the displacement of the movable frame 83 may be enlarged than that in the normal swing due to adding of large vibrations in handling the optical scanning mirror 81, a stress larger than breaking strength acts on the first hinges 85, and thus, the first hinges 85 may be damaged, and consequently, the optical scanning mirror 81 may be inoperative.

DISCLOSURE OF INVENTION

The present invention is conceived to consider the above mentioned problems, and purposes to provide an optical scanning mirror which enables to form an insulation structure in a moving unit by simple manufacturing processes, to increase yield ratio of products, to increase resonance frequency of the moving unit without upsizing the device, to increase breakproof and to be easy to use, and a semiconductor structure which is used for the optical scanning mirror and so on.

An optical scanning mirror in accordance with an aspect of the present invention comprises a semiconductor structure which is configured of a fixed frame and a moving unit pivoted on the fixed frame through first hinges so as to be rotatable relative to the fixed frame, and a mirror formed on the moving unit to reflect a light beam incoming from outward, wherein isolation trench are provided on the moving unit so as to divide the moving unit into a plurality of regions electrically insulated each other, a supporting member is provided just below the isolation trench to which the plurality of the regions of the moving unit divided by the isolation trench are coupled, and the moving unit is configured to be rotatable integrally with the supporting member.

Furthermore, a semiconductor structure in accordance with an aspect of the present invention comprises a fixed frame, and a moving unit pivoted on the fixed frame through first hinges so as to be rotatable relative to the fixed frame, wherein isolation trench are provided on the moving unit so as to divide the moving unit into a plurality of regions electrically insulated each other, a supporting member is provided just below the isolation trench to which the plurality of the regions of the moving unit divided by the isolation trench are coupled, and the moving unit is configured to be rotatable integrally with the supporting member.

According to such configurations, since the supporting member is formed just below the isolation trench and the moving unit is configured to be rotatable integrally with the supporting member, the semiconductor structure can be manufactured by simple manufacturing processes rather than the conventional processes, and mechanical strength of the moving unit can be secured. Furthermore, since the isolation trench are configured to divide the moving unit into a plurality of the regions, it is possible to maintain the electric insulation between the regions surely, and thus, yield ration of the semiconductor structures or the optical scanning mirrors in manufacture can be increased. Furthermore, since the moving unit may not be inclined so much due to the supporting member contacts a mounting face, braking of the hinges can be prevented and the semiconductor structure or the optical scanning mirror can be handled easier. Since the supporting member rotates integrally with the moving unit, resonance frequency of the moving unit can be decreased without upsizing the device, and thus, manufacturing cost of the semiconductor structure or the optical scanning mirror can be decreased.

On the other hand, a manufacturing method of a semiconductor structure in accordance with an aspect of the present invention, wherein the semiconductor structure is formed of an SOI (Silicon on Insulator) substrate which is configured of a first silicon layer and a second silicon layer joined each other through an oxide film; a fixed frame is formed on the first silicon layer, the oxide film and the second silicon layer; a moving unit is formed on the first silicon layer, pivoted on the fixed frame through supporting springs and rotatable relative to the fixed frame; and isolation trench are provided on the moving unit so as to divide the moving unit into a plurality of regions electrically insulated each other, comprises: a first process for etching the SOI substrate so as to form the supporting springs, the moving unit and the isolation trench; a second process for etching the second silicon layer so as to engrave an area of the second silicon layer just below the moving unit and the supporting springs except areas just below the isolation trench, after the first process; and a third process for removing areas of the oxide film which are exposed by engraving the second silicon layer in the second process, and forming the supporting member configured of the oxide film and the second silicon layer just below the isolation trench so as to join with the plurality of regions of the moving unit divided by the isolation trench, after the second process.

According to such manufacturing processes, it is possible to manufacture the semiconductor structure easily by simple processes for etching the SOI substrate, without performing the trench side wall oxidation process, the polysilicon filling process, and the polysilicon polishing process. Since the isolation trench are formed to divide the moving unit into a plurality of regions, electric insulation can be maintained surely between the regions, and thus, yield ration of products in manufacturing of the semiconductor structure can be increased.

BEST MODE FOR CARRYING OUT THE INVENTION

A first embodiment of the present invention is described below with reference to figures. FIG. 1A, FIG. 1B, FIG. 2, FIG. 3, FIG. 4A, FIG. 4B and FIG. 5 show an example of an optical scanning mirror in accordance with in this embodiment. The optical scanning mirror (semiconductor structure) 1 is configured to use a semiconductor structure. The optical scanning mirror 1 is a compact type one equipped in optical equipment such as a bar code reader, a projector apparatus reflecting pictorial image on an external screening or the like, or an optical switch, for example. The optical scanning mirror 1 has a function to scan light beams incoming from external light source (not illustrated).

Figure 1A:
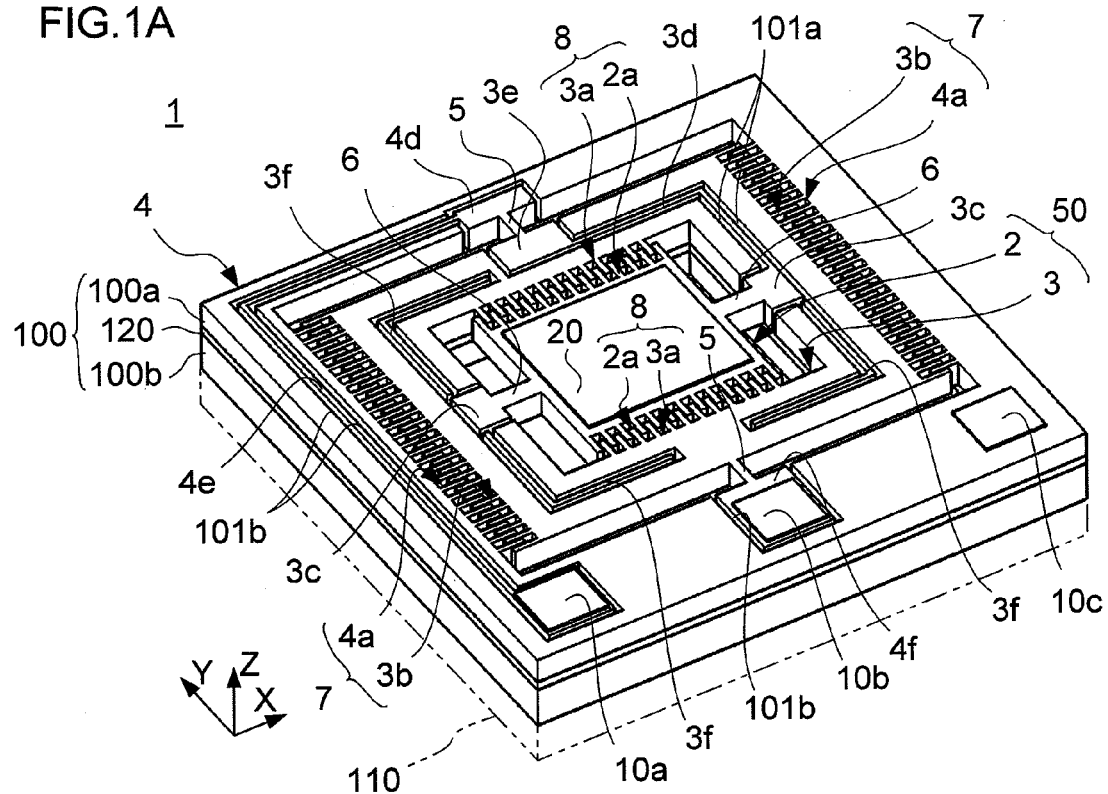
FIG. 1A is perspective view showing a top face side of an optical scanning mirror in accordance with a first embodiment of the present invention.
Figure 1B:
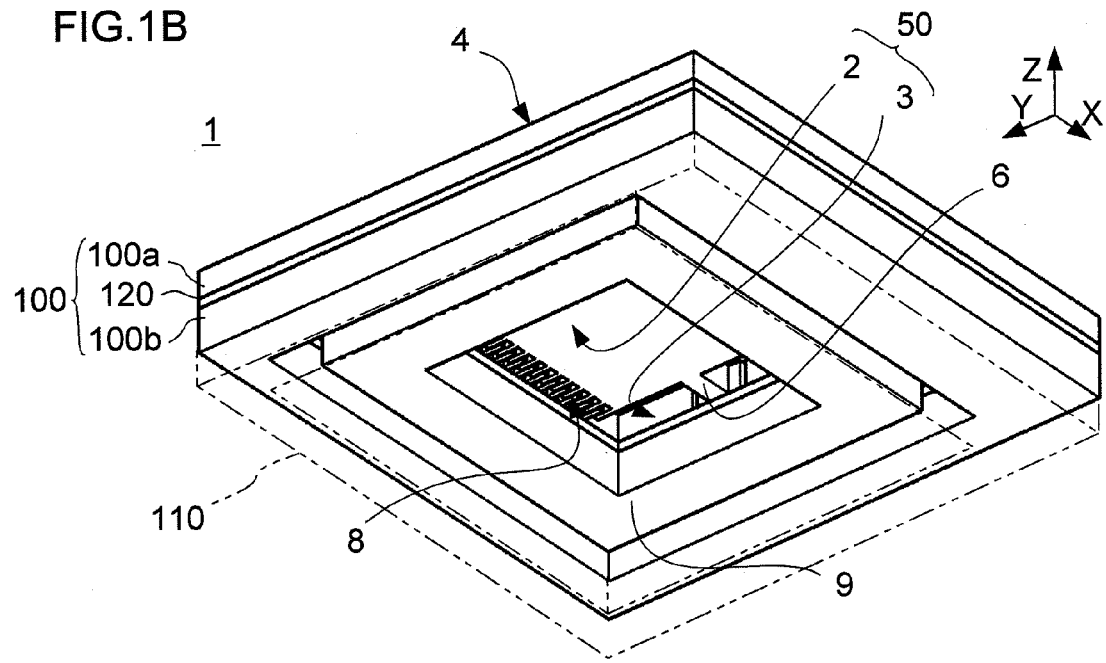
FIG. 1B is a perspective view showing a bottom face side of the optical scanning mirror.
Figure 2:
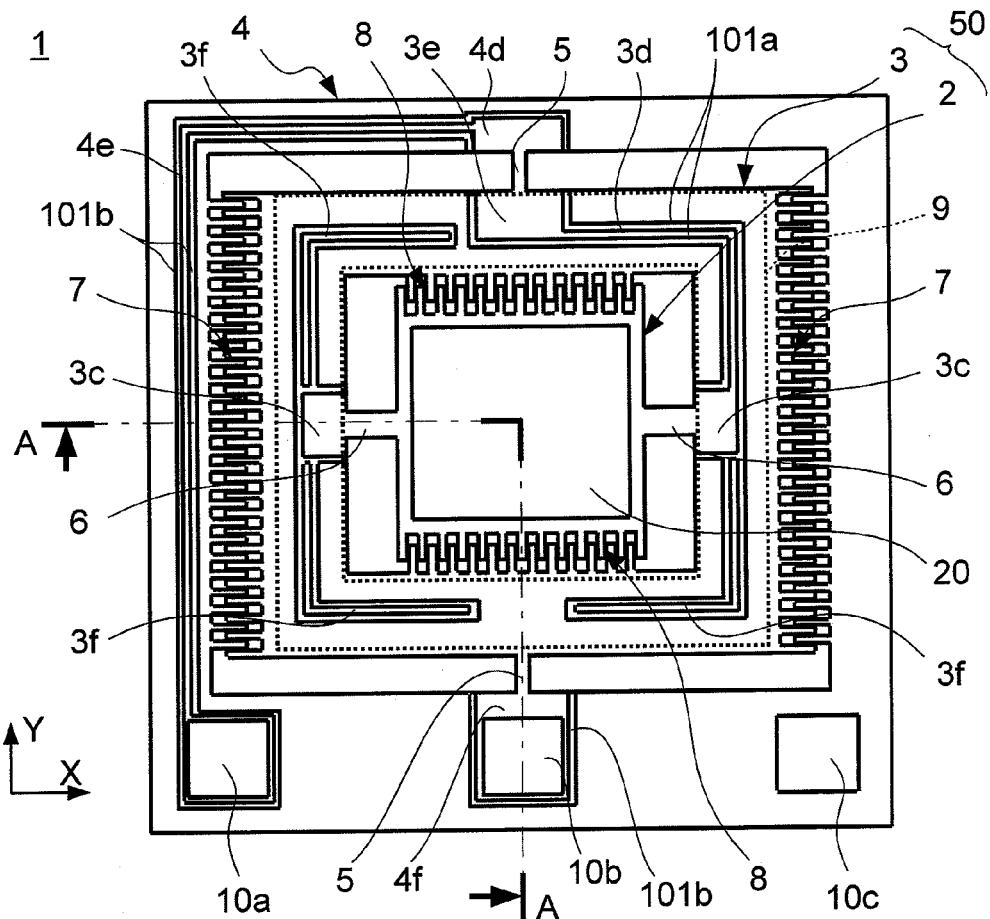
FIG. 2 is a plain view showing the above optical scanning mirror.
Figure 3:
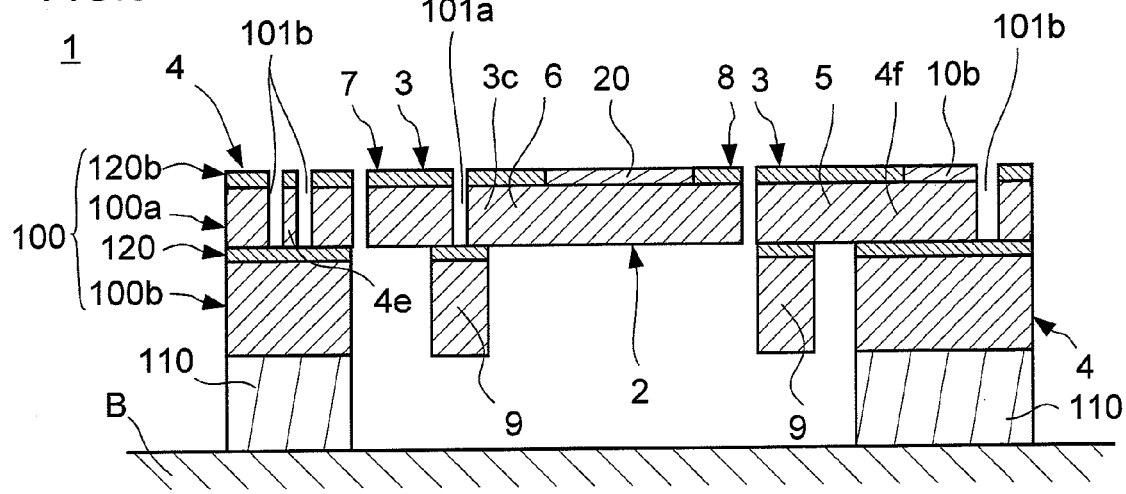
FIG. 3 is a sectional side view showing the above optical scanning mirror along A-A line of FIG. 2 in a condition mounted on a circuit board.
Figure 4A:
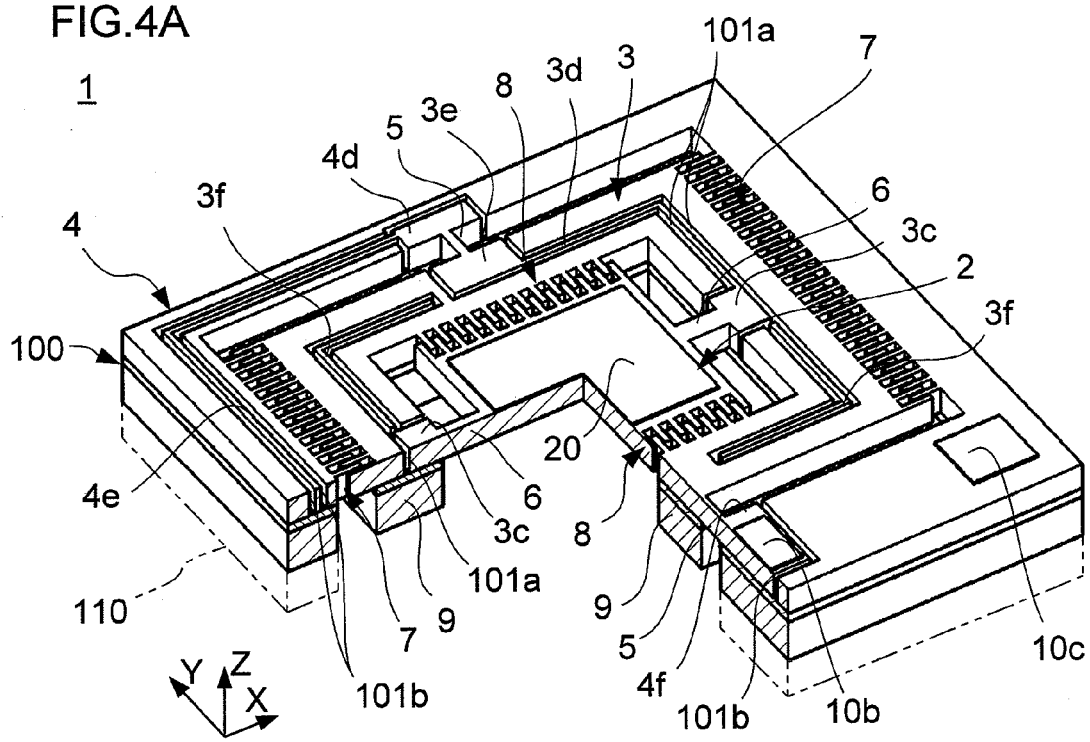
FIG. 4A is a sectional perspective view showing the top face side of the above optical scanning mirror along the A-A line.
Figure 4B:
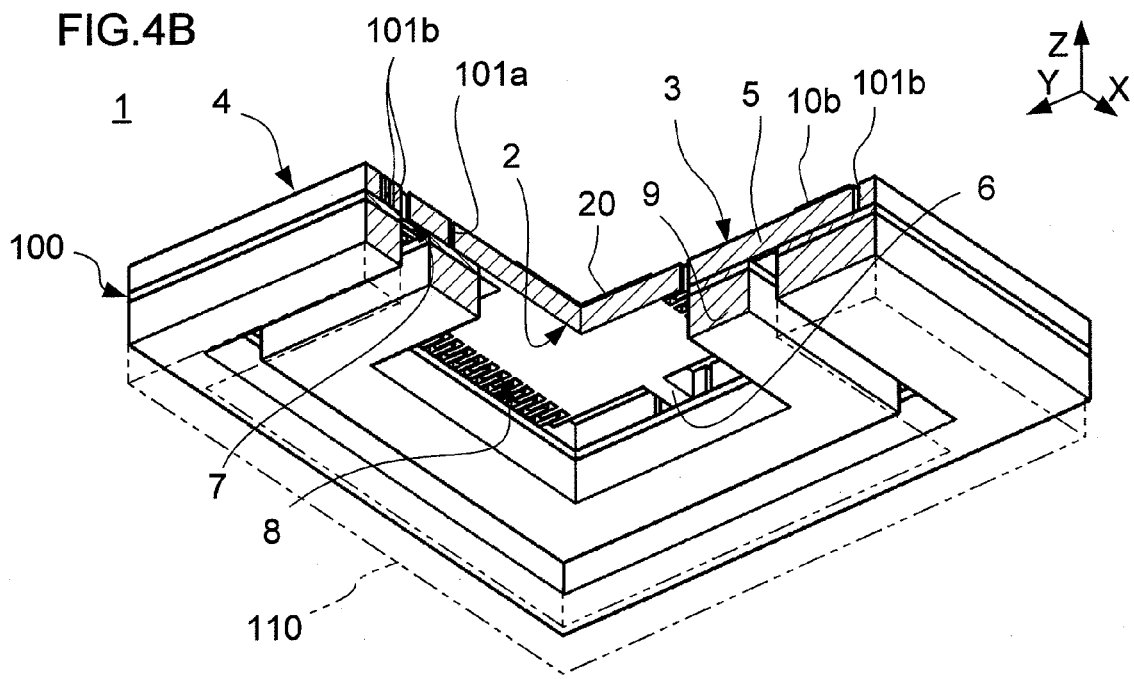
FIG. 4B is a sectional perspective view showing the bottom face side of the optical scanning mirror along the A-A line.

First, a configuration of this optical scanning mirror 1 is described. The optical scanning mirror 1 is configured of an SOI (Silicon on Insulator) substrate 100 of three layers which is formed by joining a first silicon layer 100a and a second silicon layer 100b having electrical conductivity through an oxide film 120 of silicon. Since the oxide film 120 has electric insulation characteristics, the first silicon layer 100a and the second silicon layer 100b are electrically insulated each other. A thickness of the first silicon layer 100a is about 30 µm, and, a thickness of the second silicon layer 100b is about 400 µm, for example. Furthermore, an oxide film 120b is formed on a part of a top face of the SOI substrate 100. This optical scanning mirror 1 is a rectangular parallelepiped device having a substantially square shape each side having a dimension of several µm, for example, in overhead view. The optical scanning mirror 1 is mounted on a circuit board "B" of optical equipment or the like in a condition that a spacer 110 of a glass having a predetermined thickness, for example, is joined to a part of a bottom face of the second silicon layer 100b. The oxide film 120b and the circuit board "B" are shown in FIG. 3, but illustration of them is omitted from FIG. 1A, FIG. 1B, FIG. 2, FIG. 4A, FIG. 4B and FIG. 5. Besides, the optical scanning mirror 1 does not need to have the oxide film 120b.

The optical scanning mirror 1 has a mirror unit 2 which has a substantially rectangular shape in overhead view and a mirror 20 formed on a top face thereof, a movable frame 3 which is formed as a rectangular ring shape to enclose peripheries of the mirror unit 2, and a fixed frame 4 which is formed to enclose peripheries of the movable frame 3 and serves as peripheries of the optical scanning mirror 1 and to which the spacer 110 is joined underneath thereof. The movable frame 3 and the fixed frame 4 are coupled by beam shaped two of first hinges 5 which are formed from two side faces of the fixed frame 4 opposing each other and perpendicular to each face so as to configure a single shaft arranged on a line. On the other hand, the mirror unit 2 and the movable frame 3 are coupled by beam shaped two of second hinges 6 which are formed to configure a single shaft arranged on a line in a direction perpendicular to a longitudinal direction of the first hinges 5. The first hinges 5 and the second hinges 6 are formed so that axes consist of them pass through a position of center of gravity of the mirror unit 2 in overhead view. Widths of the first hinges 5 and the second hinges 6 are respectively about 5 µm and 30 µm, for example. The mirror unit 2 is supported on the movable frame 2 rotatably relative to the movable frame 3 by the second hinges 6 serving as a rotation shaft. On the other hand, the movable frame 3 is supported on the fixed frame 4 rotatably relative to the fixed frame 4 by the first hinges 5 serving as a rotation shaft. In other words, in the optical scanning mirror 1, the mirror unit 2 and the movable frame 3 constitute a moving unit 50 which is rotatable relative to the fixed frame 4 around the shaft consists of the first hinges 5. Furthermore, the mirror unit 2 is configured two-dimensionally rotatable around two shafts respectively consist of the first hinges 5 and the second hinges 6. A supporting member 9 is provided on a bottom face of the movable frame 3, which is joined with the movable frame 3 and rotatable integrally with the movable frame 3. Furthermore, three terminal films 10a, 10b, 10c are formed on the fixed frame 4. Hereinafter, the longitudinal direction of the second hinges 6 is named X-direction, the longitudinal direction of the first hinges 5 is named Y-direction, and the direction perpendicular to both of the X-direction and the Y-direction is named Z-direction.

The optical scanning mirror 1 rotates the mirror unit 2 with using electrostatic force. In order to rotate the mirror unit 2, first comb electrodes 7 are formed at portions between the movable frame 3 and the fixed frame 4 where the first hinges 5 are not formed, and second comb electrodes 8 are formed at portions between the mirror unit 2 and the movable frame 3 where the second hinges 6 are not formed. The first comb electrodes 7 are configured so that electrodes 3b respectively formed as comb shape on two side faces of the movable frame 3 substantially perpendicular to the X-direction, and electrodes 4a respectively formed as comb shape at positions of the fixed frame 4 facing the electrodes 3b are arranged to interdigitate each other. The second comb electrodes 8 are configured so that electrodes 2a respectively formed as comb shape on two side faces of the mirror unit 2 substantially perpendicular to the Y-direction, and electrodes 3a respectively formed as comb shape at positions of the movable frame 3 facing the electrodes 2a are arranged to interdigitate each other. In the first comb electrodes 7 and the second comb electrodes 8, a gap between the electrodes 3b and 4a and a gap between the electrodes 2a and 3a are selected in a range from 2 μm to 5 μm, for example. When a voltage is applied between the electrodes 3b and 4a or the electrodes 2a and 3a, the first comb electrodes 7 and the second comb electrodes 8 generates electrostatic force acting in directions attracting each other.

The mirror unit 2, the movable frame 3, the fixed frame 4, and so on are formed by processing the SOI substrate 100 with using a micro-machining technology, as described later. The structure of the layers of the SOI substrate 100 with respect to each point of the optical scanning mirror 1 are described below.

The mirror unit 2 and the movable frame 3 are formed on the first silicon layer 100a. The mirror unit 20 is a thin film of aluminum, for example. Therefore, the mirror unit 20 can reflect light beams which are incident on a top face of the mirror unit 2 from outside. The mirror unit 2 is formed substantially symmetrical with respect to a perpendicular plane (a plane parallel to Z-X plane) passing through the second hinges 6. Therefore, the mirror unit 2 can swing around the second hinges 6, smoothly.

Trenches 101a (isolators), which penetrate the first silicon layer 100a from an upper end to lower end thereof so as to constitute groove-shaped gaps, are formed on the movable frame 3. Since the trenches 101a are formed, the movable frame 3 is divided into five regions, one of which is a region connected to one of the first hinges 5 and unitized with the electrodes 3a and the electrodes 3b, another of which is a region consists of pivot portions 3c to support two of the second hinges 6 and a pivot portions 3e which is connected to the pivot portion 3c through a conducting portion 3d and pivoted by the other of the first hinges 5, and the remainders of which are three balancing portions 3f formed to be substantially point symmetry with respect to the center of the mirror unit 2 including the conducting portion 3d in overhead view by forming the trenches 101a. Since the trenches 101a are formed to divide the first silicon layer 100a, these five regions are electrically insulated from each other. Besides, the balancing portions 3f need not to be formed.

The supporting member 9 consists of the oxide film 120 and the second silicon layer 100b below (in Z-direction) the movable frame 3. The five regions of the movable frame 3 divided by the trenches 101a are respectively joined to the supporting member 9. In other words, the supporting member 9 is formed to be joined with the first silicon layer 100a just below the portions of the movable frame 3 where the trenches 101a are formed. Since the five regions are joined to the supporting member 9, the movable frame 3 and the supporting member 9 are integrally formed to be rotatable with respect to the first hinges 5 as a rotation shaft. In this embodiment, the supporting member 9 is formed as a ring shape of substantially symmetrical with respect to the first hinges 5 in plain view to cover most of a bottom face of the movable frame 3 except the electrodes 3a and 3b. Furthermore, a thickness of a portion of the supporting member 9 which consists of the second silicon layer 100b is selected to be substantially the same as a thickness of a portion of the fixed frame 4 which consists of the second silicon layer 100b. In other words, the supporting member 9 is formed substantially symmetrical with respect to a perpendicular plane (a plane parallel to Y-Z plane) passing through the first hinges 5. Furthermore, the trenches 101a of the movable frame 3 are formed at positions and with shapes substantially symmetrical to the perpendicular plane passing through the first hinges 5 so as to form the balancing portions 3f. Thereby, center of gravity of the moving unit 50 including the supporting member 9 substantially coincides with the rotation shaft configured by the first hinges 5 in plain view. Accordingly, the moving unit 50 including the supporting member 9 is swingable around the first hinges 5, smoothly, so that scanning of the optical scanning mirror 1 can be performed appropriately.

The fixed frame 4 is configured by the first silicon layer 100a, the oxide film 120, and the second silicon layer 100b. A spacer 110 is formed on a bottom face of the fixed frame 4, so that a clearance of a thickness of the spacer 110 is formed below the supporting member 9 in a state that the optical scanning mirror 1 is mounted on the circuit board "B". Thereby, the movable frame 3 and the supporting member 9 can integrally rotate around the first hinges 5 in the motion of the optical scanning mirror 1.

Three terminal films 10a, 10b, and 10c are formed to be arranged on a line on the top face of the fixed frame 4. Trenches 101b are formed on the fixed frame 4 so as to divide the first silicon layer 101a into a plurality of regions similar to the trenches 101a. The trenches 101b divide the first silicon layer 100a of the fixed frame 4 into three regions which are electrically insulated each other and to be substantially the same potentials as those of the terminal films 10a, 10b and 10c. A region among these, which is to be the same potential as that of the terminal film 10a, has a pivot portion 4b to support one of the first hinges 5 which is distant from the terminal film 10a and connected to the pivot portion 3e of the movable frame 3. A conducting portion 4e having a narrow width and connected to the pivot portion 4d is further connected to a portion on which the terminal film 10a is formed. Furthermore, another region, which is to be substantially the same potential as that of the terminal film 10b, has a pivot portion 4f to support the other of the first hinges 5. The rest region, which is to be substantially the same potential as that of the terminal film 10c, is the region of the fixed frame 4 except the regions to be the same potentials of the terminal films 10a and 10b, and the electrodes 4a are formed on this region. The oxide film 120 and the second silicon layer 100b are joined below the first silicon layer 100a, and the trenches 101b are formed on only the first silicon layer 100a, so that the fixed frame 4 is entirely formed in a unified manner.

Figure 5:
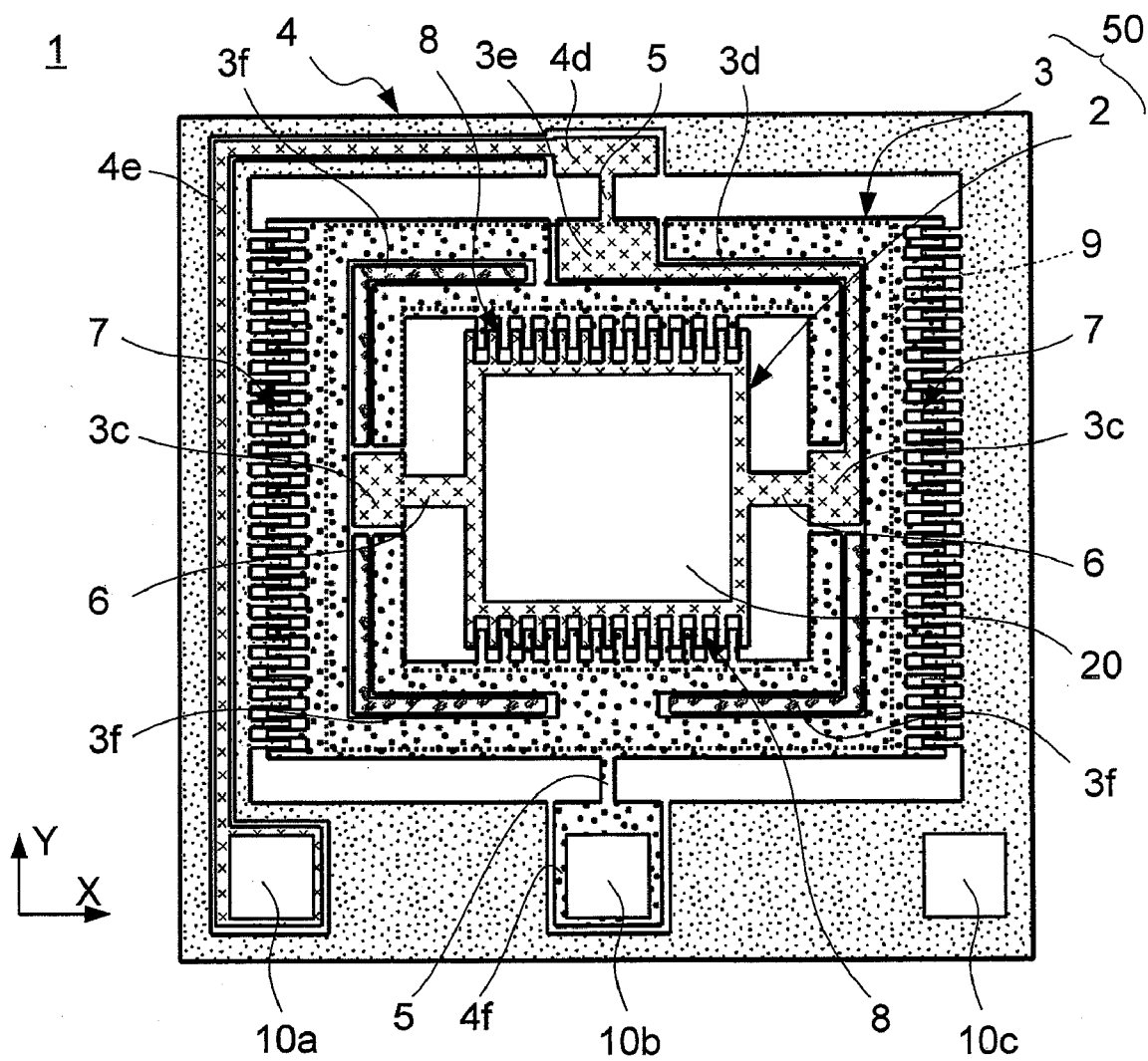
FIG. 5 is a plain view showing the above optical scanning mirror.

In FIG. 5, the regions of the first silicon layer 100a electrically insulated each other are patterned by different designs. As mentioned above, since the trenches 101a and 101b are formed on the first silicon layer 100a, three regions, potentials of which can be varied from outside, are formed on the first silicon layer 100a, one is the region on which the terminal film 10a is formed and which is to be substantially the same potential as that of the electrodes 2a, another is the region on which the terminal film 10b is formed and which is to be the same potential as that of the electrodes 3a and 3b on the movable frame 3, and the remainder is the region on which the terminal film 10c is formed and which is to be the same potential as that of the electrodes 4a on the fixed frame 4. The optical scanning mirror 1 is driven by varying the potentials of the terminal films 10a, 10b and 10c.

Motion of the optical scanning mirror 1 is described below. The first comb electrodes 7 and the second comb electrodes 8 respectively serve as vertical electrostatic combs, so that the mirror unit 2 is driven due to the first comb electrodes 7 and the second comb electrodes 8 generate driving forces by a predetermined driving frequency. The first comb electrodes 7 and the second comb electrodes 8 are driven by varying the potentials of the electrodes 2a and the electrodes 4a periodically so as to generate the driving forces in a state that the electrodes 3a and 3b are connected to a reference potential. In such optical scanning mirror 1, the first comb electrodes 7 and the second comb electrodes 8 are respectively configured to generate the driving forces periodically by being applied rectangular wave, for example.

In general, the mirror unit 2 and the movable frame 3 configured as above do not take horizontal postures in resting state in a precise sense, and they are inclined a little due to internal stress in manufacturing processes. Therefore, for example, when the first comb electrodes 7 are driven even from the resting state, a driving force substantially perpendicular to the mirror unit 2 acts on, so that the mirror unit 2 rotates around the second hinges 6 as the rotation shaft while twisting the second hinges 6. Then, the driving forces of the second comb electrodes 8 are released when the mirror unit 2 takes a posture that the electrodes 2a and 3a are completely interdigitated, the mirror unit 2 continues the rotation with twisting the second hinges 6 by inertial force thereof. Subsequently, when the inertial force of the mirror unit 2 in the rotation direction becomes equivalent to resilience of the second hinges 6, the rotation of the mirror unit 2 in the rotation direction stops. At this time, the second comb electrodes 8 are driven again, the mirror unit 2 is driven by the resilience of the second hinges 6 and the driving forces of the second comb electrodes 8, so as to start to rotate in the opposite direction. The mirror unit 2 repeats such rotations due to the driving forces of the second comb electrodes 8 and the resilience of the second hinges 6, and consequently, it wings around the second hinges 6. The movable frame 3 repeats rotations due to the driving forces of the first comb electrodes 7 and resilience of the first hinges 5, similar to the rotation of the mirror unit 2, and thus, it swings around the first hinges 5 integrally with the supporting member 9. When the movable frame 3 swings, the moving unit 50 which includes the supporting member 9 swings in a unified manner, so that the posture of the mirror unit 2 varies. Thereby, the mirror unit 2 repeats two-dimensional swing motion.

The second comb electrodes 8 are driven by applying a voltage having a frequency of substantially twofold of the resonance frequency of a vibration system which is configured by the mirror unit 2 and the second hinges 6. Furthermore, the first comb electrodes 7 are driven by applying a voltage having a frequency of substantially twofold of the resonance frequency of a vibration system which is configured by the mirror unit 2, the movable frame 3 and the first hinges 5. Thereby, the mirror unit 2 is driven with the resonance, so that the swing angle thereof is enlarged. Besides, the application and the driving frequencies of voltages of the first comb electrodes 7 and the second comb electrodes 8 are not limited to the above mentioned cases, it may be configured that the driving voltages are applied as sinusoidal waves, or, the potentials of the electrodes 3a and 3b may be varied with the potentials of the electrodes 2a and the electrodes 4a, for example.

Hereupon, when the moving unit 50 including the supporting member 9 or the mirror unit 2 is approximated as a rectangular parallelepiped having an even thickness in the optical scanning mirror 1, the resonance frequency of the swing motion of the moving unit 50 including the supporting member 9 or the resonance frequency of the swing motion of the mirror unit 2 is shown by the following formulae, where a spring constant of the first hinges 5 or the second hinges 6 is designated by a symbol "k", a mass of the moving unit 50 including the supporting member 9 or the mirror unit 2 is designated by a symbol "m", a length of a side of the moving unit 50 including the supporting member 9 or the mirror unit 2 perpendicular to the rotation shaft thereof is designated by a symbol "L", and an inertia moment of the moving unit 50 including the supporting member 9 or the mirror unit 2 is designated by a symbol "i".

Resonance Frequency:

$$f_0 = \frac{1}{2\pi}\sqrt{\frac{K}{i}}$$

Inertia Moment:

$$i = \frac{1}{12} mL^2$$

As can be seen from the above formulae, since the movable frame 3 of the moving unit 50 rotates with the supporting member 9 in a unitized manner, the mass of the portion rotating around the first hinges 5 is increased in comparison with the case that the supporting member 9 is not provided, and the inertia moment of the moving unit 50 around the first hinges 5 is largely increased in comparison with the inertia moment of the mirror unit 2 around the second hinges 6. In other words, it is possible to reduce the resonance frequency of the swing motion of the moving unit 50 including the supporting member 9 around the first hinges 5 much smaller than the resonance frequency of the swing motion of the mirror unit 2 around the second hinges 6, in this embodiment. Furthermore, in other words, it is possible to manufacture the optical scanning mirror 1 at low cost by downsizing the dimensions of the device of the optical scanning mirror with keeping the resonance frequency of the moving unit 50 by providing the supporting member 9 or to increase impactresistance of the optical scanning mirror by thickening the first hinges 5, in comparison with the conventional semiconductor structure.

In addition, as obvious from the above mentioned formulae, the farther the position of center of gravity of the supporting member 9 in a side with respect to the first hinges 5 in plain view depart from the first hinges 5, the larger the inertia moment of the moving unit 50 including the supporting member 9 around the first hinges 5 becomes. In this embodiment, the location of the supporting member 9 is selected in a manner so that the inertia moment of the moving unit 50 including the supporting member 9 around the first hinges 5 becomes a predetermined value in consideration with the spring constant of the first hinges 5, the resonance frequency of the mirror unit 2 around the second hinges 5, and so on. Thereby, it is possible to match the resonance frequency of the swing motion of the moving unit 50 including the supporting member 9 around the first hinges with a spec required to the optical scanning mirror 1, easily.

Subsequently, manufacturing processes of the optical scanning mirror 1 is described with reference to FIG. 6 to FIG. 12. Each figure shows a cross sectional view corresponding to FIG. 3. The optical scanning mirror 1 is manufactured by roughly three steps that a first step (FIG. 6 to FIG. 9) forms the mirror unit 2, the movable frame 3, the first hinges 5, the second hinges 6, and so on, on the first silicon layer 100a, a second process (FIG. 10 and FIG. 11) engraves portions of the second silicon layer 100b just below the mirror unit 2, the movable frame 3, and so on, and a third process (FIG. 12) removes portions of the oxide film 120 exposed by engraving the second silicon layer in the second process. Besides, a plurality of optical scanning mirrors 1 is simultaneously formed on an SOI substrate 100 which is a wafer having dimensions about 4 inches to 6 inches, for example, and subsequently, divided into individual optical scanning mirrors by dicing.

Figure 6:
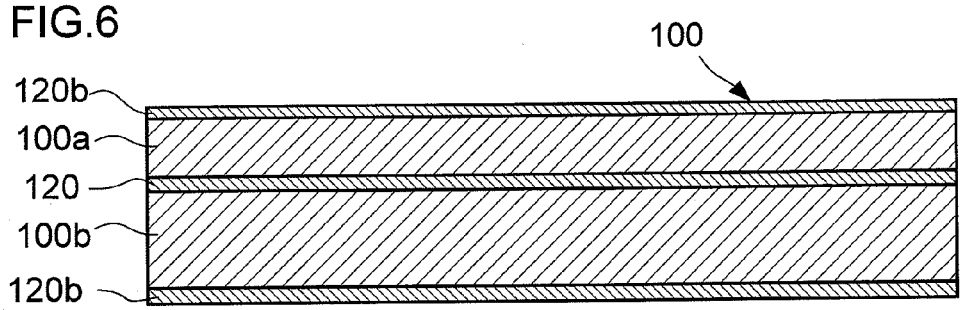
FIG. 6 is a sectional side view in a first process of manufacturing processes of the above optical scanning mirror.
Figure 7:
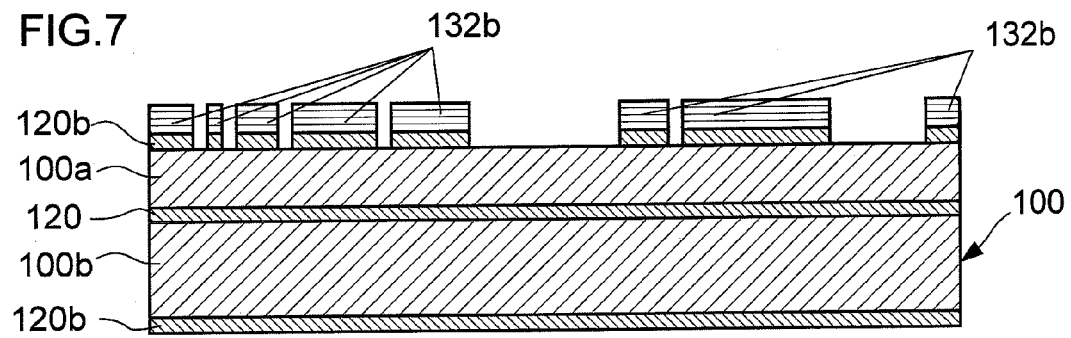
FIG. 7 is a sectional side view in the first process of the manufacturing processes of the above optical scanning mirror.
Figure 8:
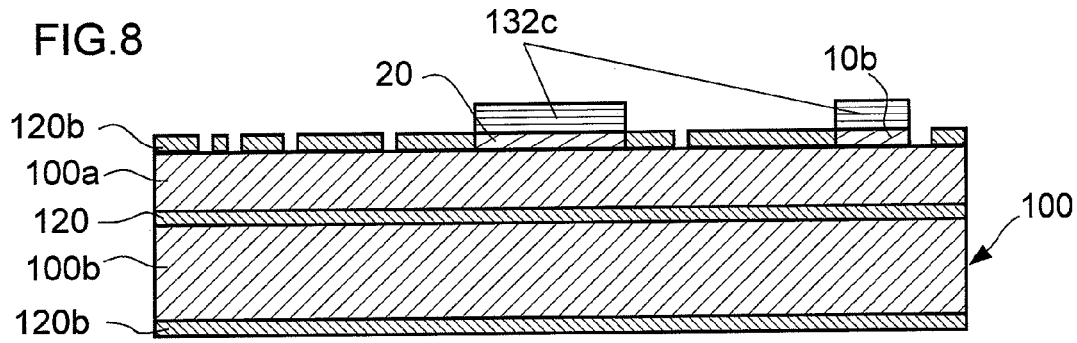
FIG. 8 is a sectional side view in the first process of the manufacturing processes of the above optical scanning mirror.

In the first process, oxide films 120b are formed on both of top and bottom surfaces of the SOI substrate 100 in a diffusion furnace of oxygen and hydrogen ambient atmosphere, first (FIG. 6). Subsequently, resists 132 are patterned on a surface of the oxide film 120b formed on the first silicon layer 100a as shapes of the moving unit 50, the first hinges 3, conducting portions 3d and 4e, and so on by photo lithography. Then, portions of the oxide film 120b which are not masked by the resists 132b are removed by RIE (Reactive Ion Etching), so as to expose the portions of the first silicon layer 100a where the moving unit 50 and so on are not to be formed (FIG. 7). Subsequently, the resists 132b are removed in oxygen plasma, and an aluminum film is formed on the top face of the first silicon layer 100a by sputtering aluminum, for example. The aluminum film is formed to have a thickness of 5000 Angstrom, for example. Subsequently, after patterning resists 132c by photo lithography, the RIE is performed, so as to remove the aluminum film except the portions corresponding to the mirror 20 and the terminal films 10a, 10b and 10c (FIG. 8).

Figure 9:
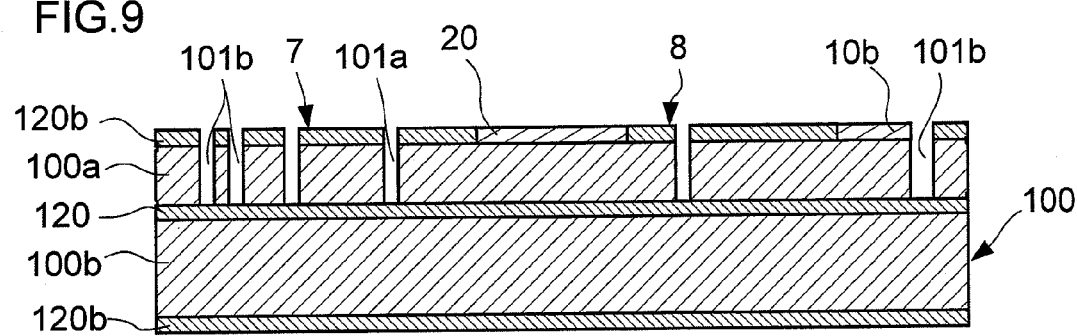
FIG. 9 is a sectional side view in the first process of the manufacturing processes of the above optical scanning mirror.

Subsequently, D-RIE (Deep Reactive Ion Etching) is performed so as to etch the portions of the first silicon layer 100a top face of which are exposed. Since etching rate of the oxide film 120 intervenient between the first silicon layer 100a and the second silicon layer 100b is less than 1% of etching rate of the first silicon layer 100a of an active layer, the oxide films 120a and 120b are rarely etched. Thereby, shapes which will be the moving unit 50, the first hinges 5, the second hinges 6, the comb electrodes 7 and 8 are formed on the first silicon layer 100a. Simultaneously, the trenches 101a are formed on the portion to be the moving unit 50, and the trenches 101b are formed on the portion to be the fixed frame 4. The resists 132c are removed in oxygen plasma (FIG. 9).

Figure 10:
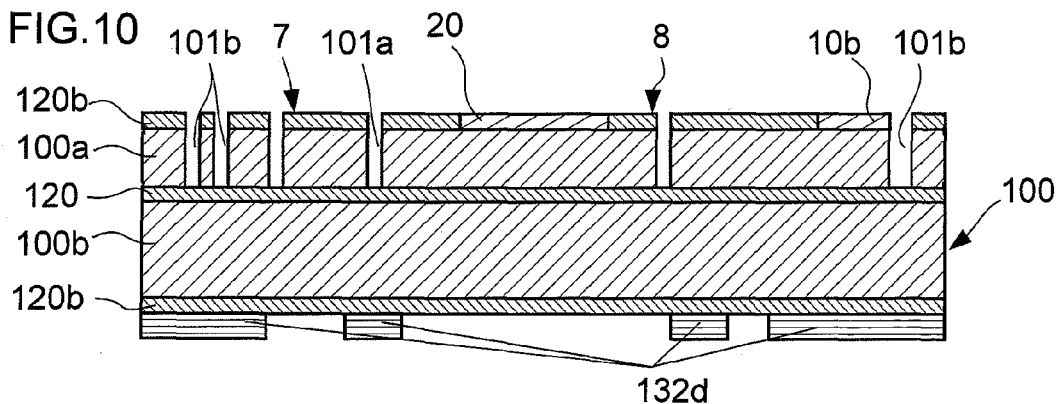
FIG. 10 is a sectional side view in a second process of the manufacturing processes of the above optical scanning mirror.
Figure 11:
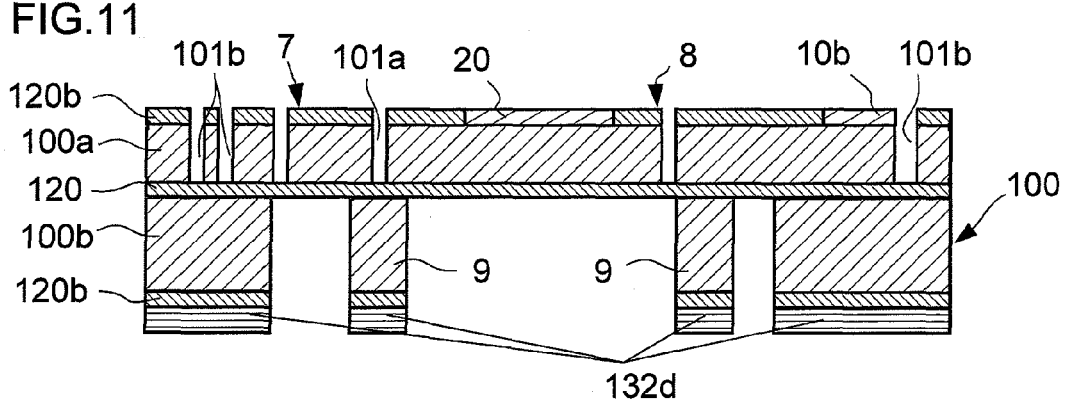
FIG. 11 is a sectional side view in the second process of the manufacturing processes of the above optical scanning mirror.

Subsequently, the second process is performed. In the second process, resists 132d are patterned on the oxide film 120b formed on the surface of the second silicon layer 100b by photo lithography, first (FIG. 10). The resists 132d are formed as shapes of the supporting member 9 and the fixed frame 4 in bottom view. Then, portions of the oxide film 120b on which the resists 132d are not formed are etched by the RIE, and subsequently, portions of the second silicon layer 100b exposed are engraved by the D-RIE (FIG. 11). Thereby, the portions just below the moving unit 50 and the first hinges 5 are engraved except the portions to be the supporting unit 9 just below the trenches 101a. At this time, the second silicon layer 100b is etched to the oxide film 120, but the oxide film 120 is rarely etched, due to difference of the etching rates of them. Subsequently, the resists 132d are removed in oxygen plasma. Alternatively, the resists 132d may be removed while the second silicon layer 100b is etched, so that the manufacturing processes can be simplified in such a case.

Figure 12:
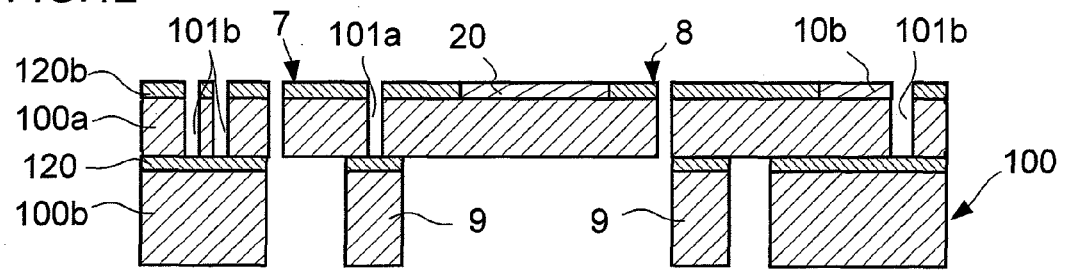
FIG. 12 is a sectional side view in a third process of the manufacturing processes of the above optical scanning mirror.

After the second process, the oxide film 120 exposed to the bottom side is removed by the RIE in the third process (FIG. 12). Thereby, the moving unit 50 and the mirror unit 2 respectively become the swingable state through the first hinges 5 and the second hinges 6. Thereby, the supporting member 9 configured of the oxide film 120 and the second silicon layer 100b is formed just below the trenches 101a in a state that a plurality of portions of the movable frame 3 insulated by the trenches 101a are joined together. Besides, the oxide film 120b on the surface of the second silicon layer 100b is removed, simultaneously. Subsequently, the spacer 110 made of silicon or glass, for example, is joined just below the fixed frame 4, and subsequently, a plurality of optical scanning mirrors 1 is cut off from the wafer by dicing, so that the optical scanning mirrors 1 are manufactured.

As mentioned above, in this embodiment, the optical scanning mirror 1, in which insulation structures are provided on the moving unit 50, can easily be manufactured by manufacturing processes of etching which are much simpler than the conventional processes, without performing complex processes such as oxidizing the side walls of the trenches 101a and filling the polysilicon into the trenches 101a like the conventional processes. Furthermore, since the movable frame 3 insulated by the trenches 101a is configured to be joined with the supporting unit 9, the mechanical strength of the moving unit 3 is ensured, so that the optical scanning mirror 1 is surely movable. Moreover, since the trenches 101a are configured to divide the movable frame 3 into a plurality of regions via gaps, electrical insulation between the regions of the movable frame 3 is surely maintained, and thus, yield ratio of the optical scanning mirror 1 in the manufacturing is increased. Still furthermore, in a state that the optical scanning mirror 1 is mounted on the circuit board "B", the movable frame 3 may not inclined too much by contacting the supporting member 9 contacts the mounting face of the optical scanning mirror 1, so that breaking of the first hinges 5 can be prevented, and thus, the optical scanning mirror 1 can be handled easier.

Figure 13:
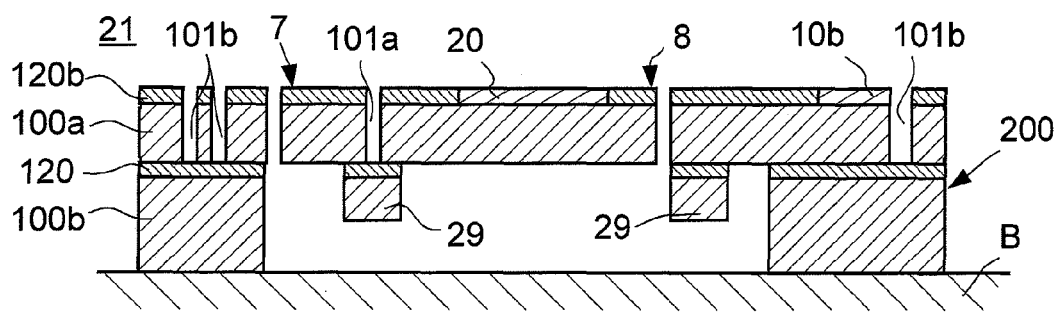
FIG. 13 is a sectional side view showing an optical scanning mirror in accordance with a second embodiment of the present invention.

FIG. 13 shows an optical scanning mirror in accordance with a second embodiment of the present invention. Section shown in FIG. 13 corresponds to FIG. 3 in the first embodiment. In the following embodiments, configurations equivalent to those in the above mentioned embodiment are added the same symbols, so that only the different portions from the above mentioned embodiment are described. In an optical scanning mirror 21, shapes of a supporting member 29 just below trenches 101a are different from those of the supporting member 9 of the optical scanning mirror 1 in the first embodiment. The optical scanning mirror 21 can be disposed on a circuit board "B" without providing the spacer 110 like the optical scanning mirror 1 in the first embodiment.

In the optical scanning mirror 21, the supporting member 29 is formed so that a dimension in thickness (about 200 µm, for example) from a bottom face of a movable frame 3 to a lower end of the supporting member 29 is smaller than a dimension in thickness (about 400 µm, for example) from the bottom face of the movable frame 3 to a lower end of a fixed frame 4. Furthermore, the thickness of the supporting member 29 is selected in a manner so that an inertia moment of a moving unit 50 including the supporting member 29 around first hinges 5 becomes a predetermined value in consideration with a spring constant of the first hinges 5, and so on.

Figure 14:
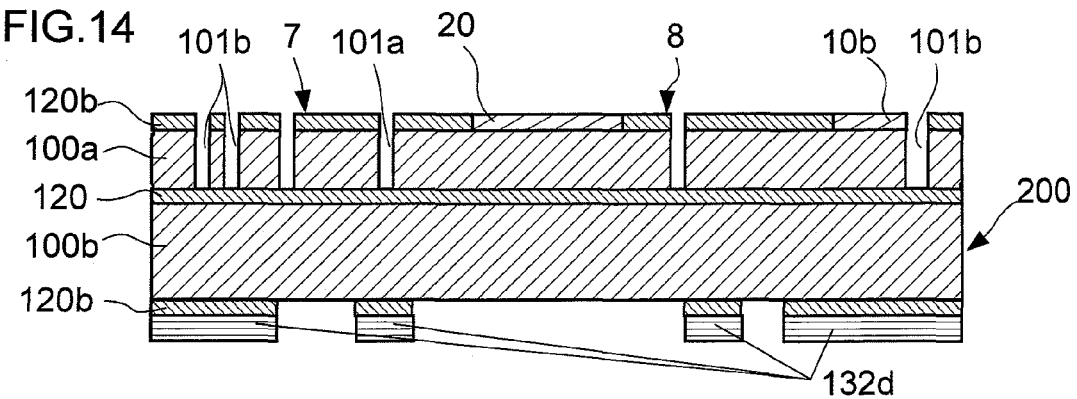
FIG. 14 is a sectional side view in the second process of the manufacturing processes of the above optical scanning mirror.
Figure 15:
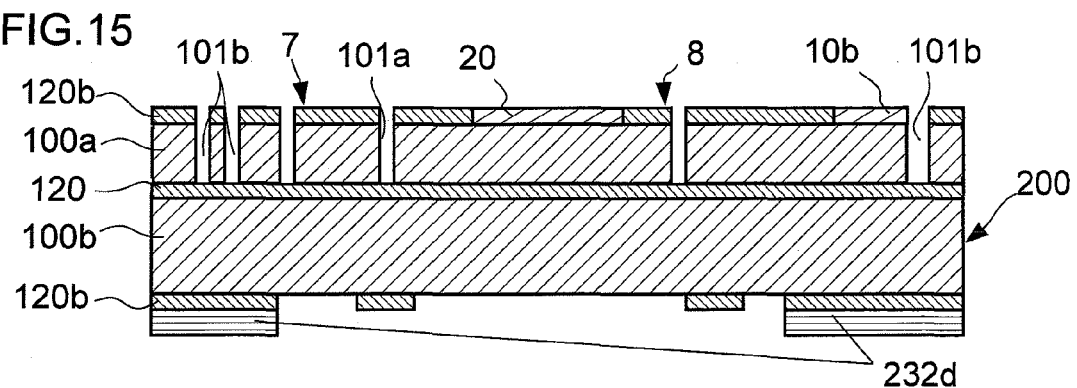
FIG. 15 is a sectional side view in the second process of the manufacturing processes of the above optical scanning mirror.
Figure 16:
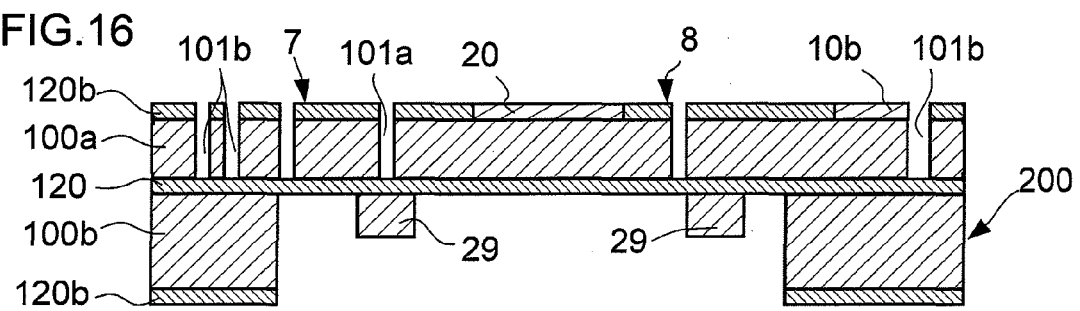
FIG. 16 is a sectional side view in the second process of the manufacturing processes of the above optical scanning mirror.

Manufacturing processes of the optical scanning mirror 21 are described with reference to FIG. 14 to FIG. 16. In the manufacturing processes of the optical scanning mirror 21, and especially in a second process (FIG. 14 to FIG. 16), it is different that etching is performed so as to make a thickness of portions of a second silicon layer 100b which will be the supporting member 29 smaller than a thickness of portions of the second silicon layer 100b which will be the fixed frame 4. A first process and a third process are performed similar to those in the first embodiment.

In the second embodiment, portions of an oxide film 120b on a surface of the second silicon layer 100b which correspond to portions of the second silicon layer 100b to be etched are removed by RIE in the second process (FIG. 14), and resists 132d formed at the time are removed in oxygen plasma. Then portions corresponding to the fixed frame 4 are covered by forming resists 232d (FIG. 15). Subsequently, the second silicon layer 100b is etched by performing D-RIE, so that portions just below the moving unit 50 and the first hinges 5 are engraved (FIG. 16). At this time, since oxide films 120b are formed on surfaces of portions of the second silicon layer 100b to be the supporting member 29, the portions will be etched after that the oxide film 120d are etched. Since etching rate of the oxide film 120b is different from that of the second silicon layer 100b, a speed that the oxide film 120d is etched is different from that the second silicon layer 100b is etched. Therefore, when the portions of the second silicon layer 100b to which the oxide films 120b are not formed are completely engraved, at least the portion on which the oxide film 120d are formed become in a state that they are not etched completely. Therefore, etching is performed in a manner so that the thickness of the portions of the second silicon layer 100b to be the supporting member 29 is smaller than the thickness of the portion of the second silicon layer 100b to be the fixed frame 4.

In this way, according to the second embodiment, since the lower end of the supporting member 29 is located above the lower end of the fixed frame 4, there is no need to provide a spacer 110 and so on just below the fixed frame 4, and thus, the optical scanning mirror 21 having a low-profile for mounting can be manufactured. In addition, it is possible to select an inertia moment of the moving unit 50 around the first hinges 5 can easily selected by changing the thickness of the supporting member 29. Thereby, the optical scanning mirror 21 can easily be manufactured so that resonance frequency of swing motion of the moving unit 50 including the supporting member 29 around the first hinges 5 is adjusted to a spec required to the optical scanning mirror 21.

In addition, in the second embodiment, the oxide film 120b may be formed on a surface of an SOI substrate 100 to be a thickness in consideration of desired thickness of the supporting member 29 in the first process. Furthermore, the oxide films 120b on the surfaces of the portions to be the supporting member 29 are processed to be thinner after removing the oxide from 120b by the RIE in the second process. At this time, it is preferable that the thickness of the oxide film 120b is selected so that the thickness of the portions of the second silicon layer 100b to be the supporting member 29 becomes desired thickness, when the portions of the second silicon layer 100b on which the oxide films 120b are not formed is completely etched. In this way, since the thickness of the oxide films 12b is optimized before engraving the second silicon layer 100b by the D-RIE as mentioned above, it is possible to shorten a time necessary for etching the second silicon layer 100b, and thus, the second silicon layer 100b can be processed precisely.

Figure 17:
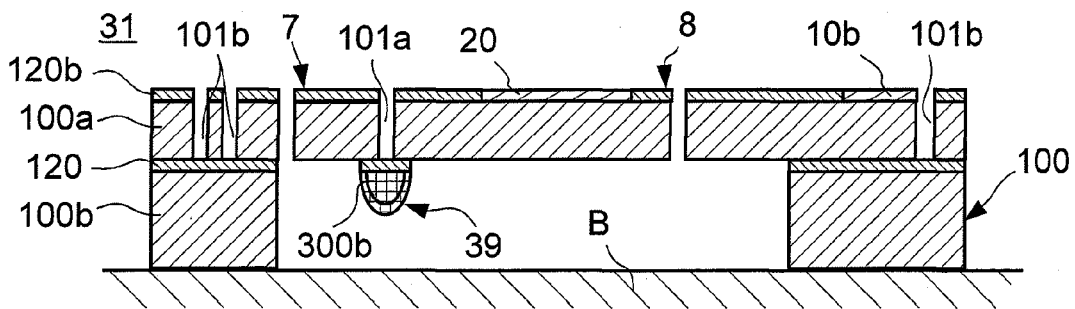
FIG. 17 is a sectional side view showing an optical scanning mirror in accordance with a third embodiment of the present invention.

FIG. 17 shows an optical scanning mirror using a semiconductor structure in accordance with a third embodiment of the present invention. Section shown in FIG. 17 corresponds to FIG. 3 in the first embodiment. In an optical scanning mirror 31, a supporting member 39 just below trenches 101a is configured of a high density boron diffusion region 300b formed on a second silicon layer 100b. In addition, the supporting member 39 is formed only just below the trenches 101a. The optical scanning mirror 31 is configured in a manner so that it cab be disposed on a circuit board "B" without providing a spacer 110, similar to the optical scanning mirror 21 in the second embodiment.

Figure 21:
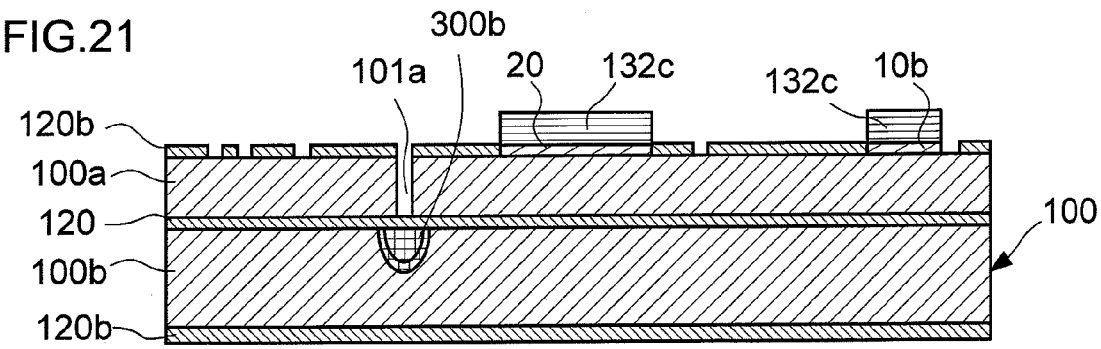
FIG. 21 is a sectional side view in the first process of the manufacturing processes of the above optical scanning mirror.
Figure 22:
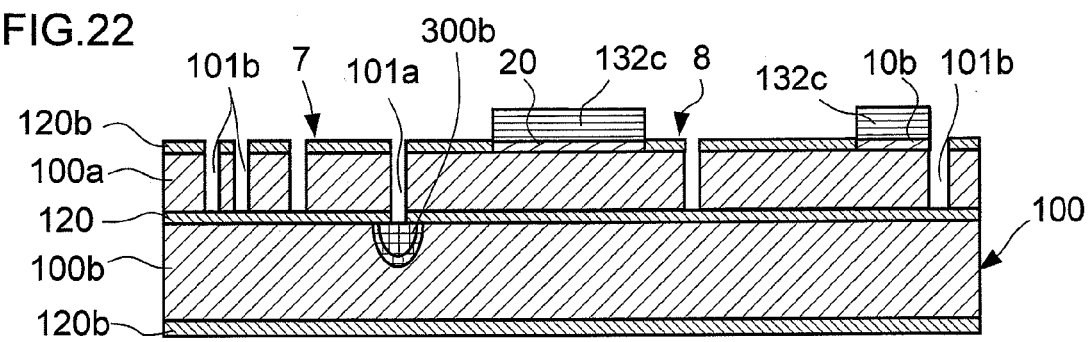
FIG. 22 is a sectional side view in the first process of the manufacturing processes of the above optical scanning mirror.
Figure 23:
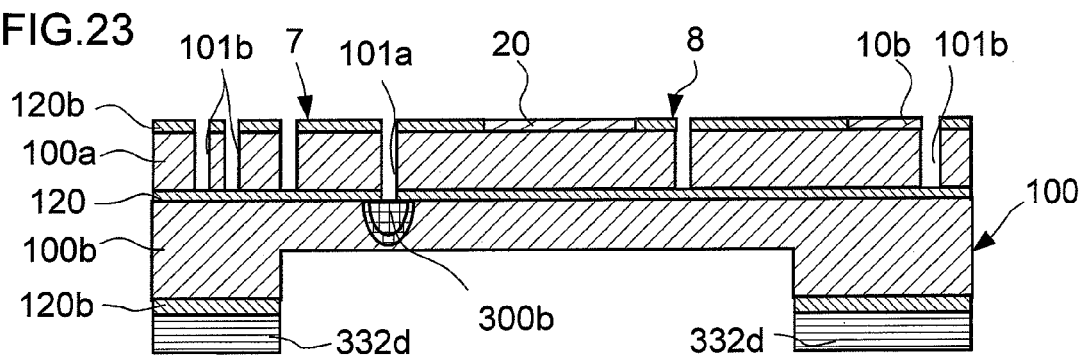
FIG. 23 is a sectional side view in the second process of the manufacturing processes of the above optical scanning mirror.
Figure 24:
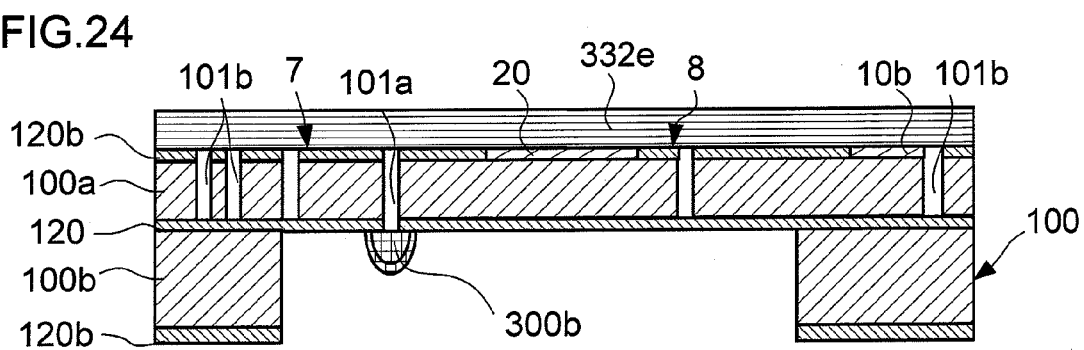
FIG. 24 is a sectional side view in the second process of the manufacturing processes of the above optical scanning mirror.
Figure 25:
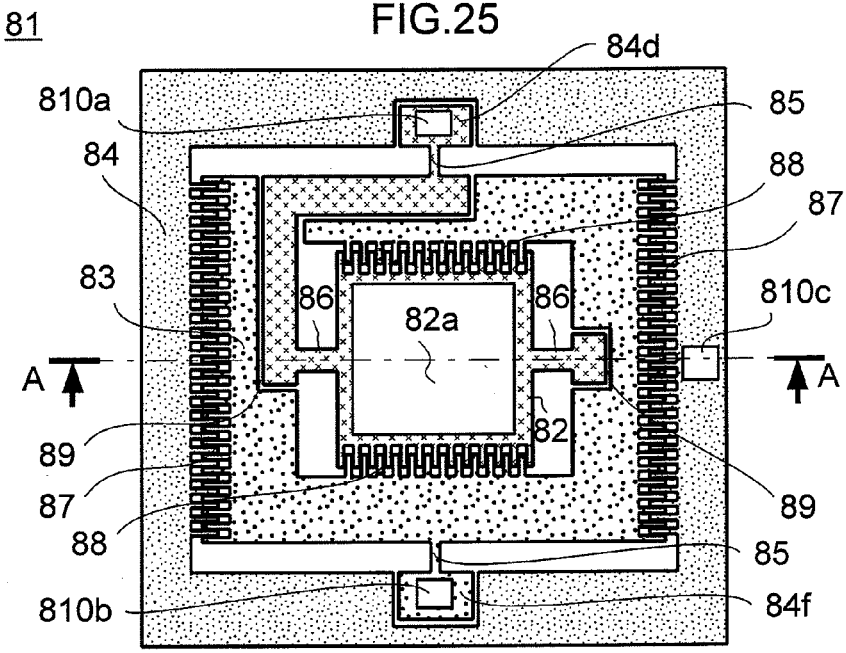
FIG. 25 is a plan view showing a conventional optical scanning mirror.
Figure 26:
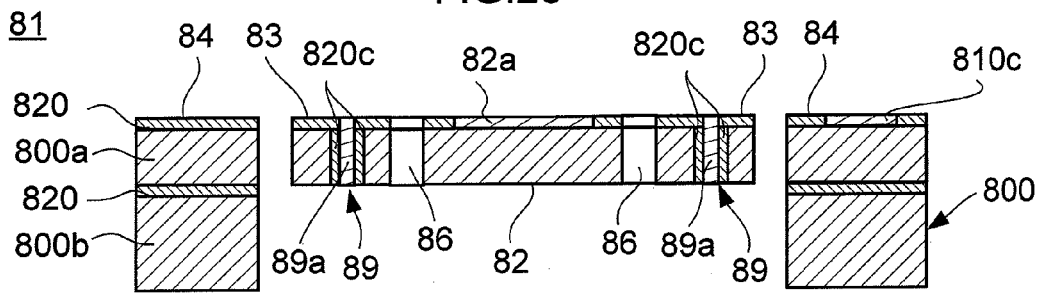
FIG. 26 is a sectional side view showing the conventional optical scanning mirror.
Figure 27A:
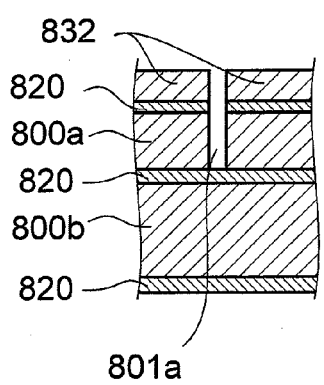
FIG. 27A, FIG. 27B, FIG. 27C are sectional side views showing formation steps of isolation trench of the conventional optical scanning mirror in time series.
Figure 27B:
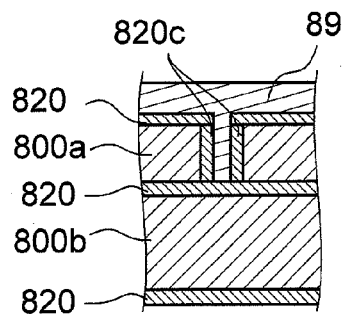
Figure 27C:
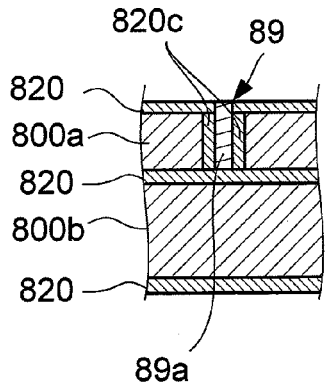

Manufacturing processes of the optical scanning mirror 31 is described with reference to FIG. 18 to FIG. 24. In the manufacturing processes of the optical scanning mirror 31, it is especially different from the above mentioned first embodiment that boron diffusion into the second silicon layer 100b is performed in a first process (FIG. 18 to FIG. 22), and etching is performed with using an etchant having selectivity for the high density boron diffusion region 300b in a second process (FIG. 23 and FIG. 24). A third process is performed similar to that in the first embodiment.

Figure 18:
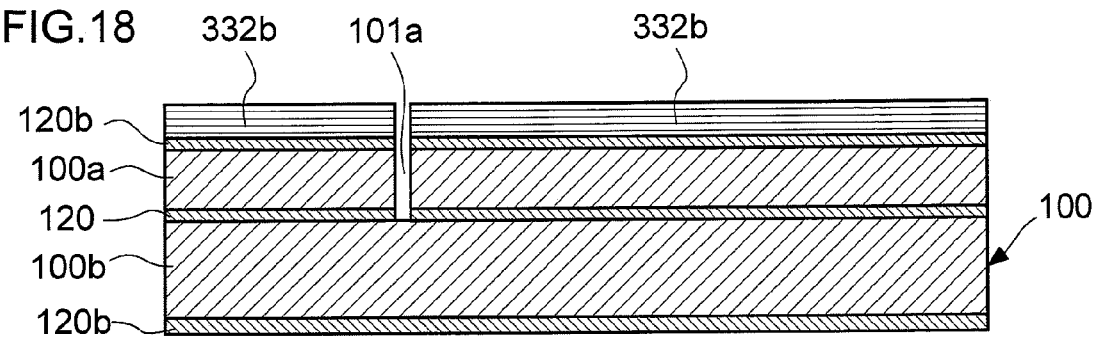
FIG. 18 is a sectional side view in the first process of the manufacturing processes of the above optical scanning mirror.
Figure 19:
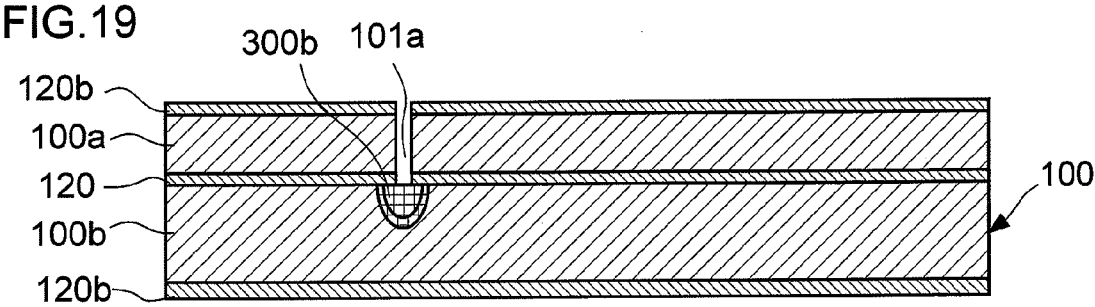
FIG. 19 is a sectional side view in the first process of the manufacturing processes of the above optical scanning mirror.

In the first process, resists 332b to form the trenches 101a are formed on a surface of a first silicon layer 100a of an SOI substrate 100 that an oxide film 120b is formed on a surface thereof by photo lithography, similar to the first embodiment. Then, the oxide film 120b and the first silicon layer 100a are etched by performing RIE and D-RIE in sequence, so that the trenches 101a are formed. Subsequently, the RIE is further performed so as to remove the oxide film 120 just below the trenches 101a (FIG. 18). Then, boron diffusion using boron solid-phase source is performed to portions of the second silicon layer 100b exposed by removing the oxide film 120 in a diffusion furnace (FIG. 19). Thereby, the high density boron diffusion region 300b is formed in the second silicon layer 100b. By performing the boron diffusion, oxide films 120 are formed on the portions of the second silicon layer 100b exposed.

Figure 20:
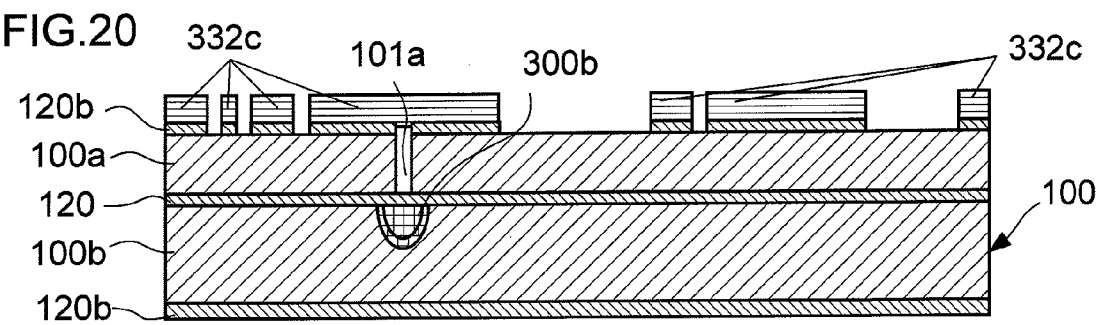
FIG. 20 is a sectional side view in the first process of the manufacturing processes of the above optical scanning mirror.

Subsequently, resists 332c are patterned on a top face of the oxide film 120b on a surface of the first silicon layer 100a, and exposed portions of the oxide film 120b are etched by the RIB. Thereby, portions to which etching is performed to form a moving unit 50, first hinges 5 and second hinges 6 and portions to which a mirror 20 and terminal films 10a, 10b and 10c are formed on the first silicon layer 100a are exposed (FIG. 20). Then, removing the resists 332c in oxygen plasma, sputtering aluminum, forming resists 132c and etching the aluminum are performed similar to the first embodiment, so that the mirror 20 and the terminal films 10a, 10b and 10c are formed (FIG. 21). Subsequently, the first silicon layer 100a is processed by the D-RIE to form the shapes to be the moving unit 50, the first hinges 5, the second hinges 6, comb electrodes 7 and 8, and trenches 101b (FIG. 22). The resists 132c are removed.

In the second process, resists 332d are formed on the oxide film 120b on the surface of the second silicon layer 100b, first. The resist 332d are formed as the same shapes as that of a fixed frame 4 in bottom view. Subsequently, the exposed oxide films 120b are removed by the RIB, and the second silicon layer 100b just below the moving unit 50 and the first hinges 5 are etched by the D-RIE. At this time, the etching is completed just before the etched region reaches to the high density boron diffusion region 300b so as to remain the second silicon layer 100b by about 200 μm, for example (FIG. 23). Subsequently, a protection film 332e is formed on a surface of the first silicon layer 100a of the SOI substrate 100, and the remained portion of the second silicon layer 100b is etched with using an etchant having selectivity for the high density boron diffusion region 300b (FIG. 24). As for the etchant having selectivity for the high density boron diffusion region 300b, alkali such as KOH or ethylenediamine pyrocatechol can be used. Thereby, when the etching of the second silicon layer 100b is completed, the high density boron diffusion region 300b and the oxide film 20 remain. Subsequently, by removing the protection film 332e and performing the third process, the optical scanning mirror 31 having the supporting member 39 configured by the high density boron diffusion region 300b is manufactured.

In this way, according to the third embodiment, the high density boron diffusion region 300b can be formed in desired dimension by controlling diffusion depth of boron in boron diffusion process in the first process. Therefore, dimensions of the supporting member 39 can be controlled more precisely, so that resonance frequency of the moving unit 50 including the supporting member 39 can be selected more precisely.

The present invention is not limited to the configurations of the above mentioned embodiments, and it is possible to modify in various manners in a scope not to change the gist of the invention. For example, the mirror unit and the moving unit are not limited to rectangular shape, and they may be shaped circular or oval. Furthermore, the semiconductor device is not limited to one having a mirror formed on the moving unit, and it may be one having an element which is driven by applying voltage and mounted on the moving unit. Still furthermore, the optical scanning mirror may be manufactured by different manufacturing processes that perform etching of each portion in different order from the above mentioned processes.

Furthermore, the optical scanning mirror may have comb electrodes opposing each other which are not formed on the same plane at initial state with a predetermined angular discrepancy or a predetermined positional discrepancy. Furthermore, the optical scanning mirror may have no pectinate electrode and be driven by different manner from above using electrostatic force generated by applying a voltage between a circuit board and a moving board, for example. Still furthermore, the optical scanning mirror is not limited to biaxial type optical scanning mirror that the mirror unit swings around two shafts, ad it may be configured that the moving unit is not departed in the mirror unit and the movable frame and swings around one shaft configured of the first hinges.

This application is based on Japanese patent application 2007-15970 and Japanese patent application 2007-15980 filed in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

The invention claimed is:

1. An optical scanning mirror, comprising:
   a stationary frame;
   a movable frame which is coupled to the stationary frame through two first hinges which are formed to configure a first shaft, and is rotatable around the first shaft;
   a mirror unit which is coupled to the movable frame through two second hinges which are formed to configure a second shaft, and is swingable around the second shaft;
   a mirror face formed on a top face of the mirror unit to reflect a light beam incoming from outward;
   first comb electrodes which are formed at portions on faces of the movable frame and the stationary frame opposing each other where the first hinges are not formed so as to generate driving forces to swing the movable frame around the first shaft;
   second comb electrodes which are formed at portions on faces of the mirror unit and the movable frame opposing each other where the second hinges are not formed so as to generate driving forces to swing the mirror unit around the second shaft; and
   a supporting member which is provided on a bottom face of the movable frame disposed at an opposite side of the mirror face; wherein
   the movable frame is divided into at least a first region where the first comb electrodes and the second comb electrodes are formed and a second region where the second comb electrodes of the mirror unit are formed, wherein the first region and the second region are electrically insulated by trenches; and
   the first region and the second region are joined to the supporting member.

2. The optical scanning mirror in accordance with claim 1, wherein
   the first region of the movable frame is electrically connected to one of the first hinges and the second region of the movable frame is connected to the other of the first hinges via one of the second hinges.

3. The optical scanning mirror in accordance with claim 2, wherein
   the stationary frame is divided into a third region where the first comb electrodes are formed, a fourth region to which the one of the first hinges is connected and a fifth region to which the other of the first hinges is connected; and
   the third region, the forth region and the fifth region are joined by a layer which is formed simultaneously with the supporting member.

4. The optical scanning mirror in accordance with claim 3, wherein
   the stationary frame, the movable frame and the supporting member respectively have a rectangular ring shape, and the mirror unit has a rectangular shape in plain view.

5. The optical scanning mirror in accordance with claim 1, wherein
   a spacer having a predetermined thickness is joined to a face of the layer which is disposed at an opposite side to the mirror face.

6. The optical scanning mirror in accordance with claim 1, wherein
the supporting member has a dimension from the bottom face of the movable frame to a lower end of the supporting member smaller than a dimension from the bottom face of the movable frame to a lower end of the stationary frame.

7. The optical scanning mirror in accordance with claim 2, wherein
a thickness of the supporting member is selected in a manner so that an inertia moment of a moving unit including the mirror unit, the movable frame and the supporting member around first hinges becomes a predetermined value.

8. The optical scanning mirror in accordance with claim 4, wherein
the first region of the movable frame is electrically connected to one of the first hinges and the second region of the movable frame is connected to the other of the first hinges via one of the second hinges.

9. The optical scanning mirror in accordance with claim 4, wherein
the stationary frame is divided into a third region where the first comb electrodes are formed, a fourth region to which the one of the first hinges is connected and a fifth region to which the other of the first hinges is connected; and
the third region, the forth region and the fifth region are joined by a layer which is formed simultaneously with the supporting member.

10. The optical scanning mirror in accordance with claim 4, wherein
a spacer having a predetermined thickness is joined to a face of the layer which is disposed at opposite side to the mirror face.

11. The optical scanning mirror in accordance with claim 4, wherein
the supporting member has a dimension from the bottom face of the movable frame to a lower end of the supporting member smaller than a dimension from the bottom face of the movable frame to a lower end of the stationary frame.

12. The optical scanning mirror in accordance with claim 4, wherein
a thickness of the supporting member is selected in a manner so that an inertia moment of a moving unit including the mirror unit, the movable frame and the supporting member around first hinges becomes a predetermined value.

13. A manufacturing method of an optical scanning mirror, wherein
the optical scanning mirror comprises:
a stationary frame;
a movable frame which is coupled to the stationary frame through two first hinges which are formed to configure a first shaft, and is rotatable around the first shaft;
a mirror unit which is coupled to the movable frame through two second hinges which are formed to configure a second shaft, and is swingable around the second shaft;
a mirror face formed on a top face of the mirror unit to reflect a light beam incoming from outward;
first comb electrodes which are formed at portions on faces of the movable frame and the stationary frame opposing each other where the first hinges are not formed so as to generate driving forces to swing the movable frame around the first shaft;
second comb electrodes which are formed at portions on faces of the mirror unit and the movable frame opposing each other where the second hinges are not formed so as to generate driving forces to swing the mirror unit around the second shaft; and
a supporting member which is provided on a bottom face of the movable frame disposed at an opposite side of the mirror face; wherein
the movable frame is divided into at least a first region where the first comb electrodes and the second comb electrodes are formed and a second region where the second comb electrodes of the mirror unit are formed, wherein the first region and the second region are electrically insulated by trenches; and
the first region and the second region are joined to the supporting member;
and the manufacturing method comprises:
preparing an SOI (Silicon on Insulator) substrate which is configured of a first silicon layer and a second silicon layer joined each other through an oxide film;
forming the movable frame, the mirror unit, the first hinges, the first comb electrodes, the second comb electrodes and the trenches on the first silicon layer by etching the first silicon layer; and
engraving regions of the second silicon layer corresponding to the movable frame, the mirror unit, the first hinges, the first comb electrodes, the second comb electrodes and the trenches except a region corresponding to the supporting member by etching the second silicon layer.

14. The manufacturing method of the optical scanning mirror in accordance with claim 13, wherein
in the process of etching the second silicon layer, etching is performed so that a thickness of a region corresponding to the supporting member is smaller than a thickness of a region corresponding to the stationary frame.

15. The manufacturing method of the optical scanning mirror in accordance with claim 13, wherein
the process of etching the first silicon layer includes removing oxide film at portions exposed by forming the trenches, and diffusing boron into the second silicon layer at portions exposed thereby so as to form high density boron diffusion regions; and
in the process of etching the second silicon layer, etching is performed to the second silicon layer using an etchant having selectivity for the high density boron diffusion region, so that the supporting member is configured of the high density boron diffusion region.

* * * * *